US008140310B2

(12) United States Patent
Fitzpatrick et al.

(10) Patent No.: US 8,140,310 B2
(45) Date of Patent: Mar. 20, 2012

(54) RESERVOIR FRACTURE SIMULATION

(75) Inventors: Tony Fitzpatrick, Old Boars Hill (GB); Haythem Ounaissa, Beni Khiar (TN)

(73) Assignee: Schlumberger Technology Corporation, Sugar Land, TX (US)

( * ) Notice: Subject to any disclaimer, the term of this patent is extended or adjusted under 35 U.S.C. 154(b) by 684 days.

(21) Appl. No.: 12/262,217

(22) Filed: Oct. 31, 2008

(65) Prior Publication Data

US 2009/0119082 A1 May 7, 2009

Related U.S. Application Data

(60) Provisional application No. 60/984,704, filed on Nov. 1, 2007.

(51) Int. Cl.
G06F 9/455 (2006.01)

(52) U.S. Cl. ......................................................... 703/10
(58) Field of Classification Search .................. 703/2, 10, 703/9; 166/302; 702/6, 11; 367/38
See application file for complete search history.

(56) References Cited

U.S. PATENT DOCUMENTS

| | | | |
|---|---|---|---|
| 5,992,519 A | 11/1999 | Ramakrishnan et al. | |
| 6,313,837 B1 | 11/2001 | Assa et al. | |
| 7,248,259 B2 | 7/2007 | Fremming et al. | |
| 2002/0120429 A1* | 8/2002 | Ortoleva | 703/2 |
| 2003/0216897 A1 | 11/2003 | Endres et al. | |
| 2003/0225522 A1* | 12/2003 | Poe | 702/11 |
| 2005/0149307 A1 | 7/2005 | Gurpinar et al. | |
| 2005/0171751 A1* | 8/2005 | Siebrits et al. | 703/10 |
| 2006/0122777 A1* | 6/2006 | Patzek et al. | 702/6 |
| 2006/0153005 A1* | 7/2006 | Herwanger et al. | 367/38 |
| 2006/0197759 A1 | 9/2006 | Fremming | |
| 2006/0224370 A1* | 10/2006 | Siebrits et al. | 703/10 |
| 2007/0209799 A1* | 9/2007 | Vinegar et al. | 166/302 |
| 2007/0255545 A1* | 11/2007 | Pita et al. | 703/10 |
| 2007/0272407 A1 | 11/2007 | Lehman et al. | |
| 2008/0133186 A1* | 6/2008 | Li et al. | 703/2 |
| 2008/0133193 A1* | 6/2008 | Gdanski et al. | 703/10 |

FOREIGN PATENT DOCUMENTS

| | | |
|---|---|---|
| WO | 9964896 | 12/1999 |
| WO | 02/086277 A1 | 10/2002 |
| WO | 2004049216 | 6/2004 |
| WO | 2005/026496 A1 | 3/2005 |
| WO | 2006/003118 A1 | 1/2006 |
| WO | 2006/138530 A1 | 12/2006 |

* cited by examiner

Primary Examiner — Kandasamy Thangavelu

(57) ABSTRACT

Reservoir fracture simulation relates to a method of evaluating a reservoir. Data associated with properties of the reservoir as well as properties of a fracture in the reservoir, is collected. This data is then used in conjunction with a correlation matrix to determine modification parameters of a reservoir model of the reservoir. The correlation matrix corresponds to an empirical functional relationship between the modification parameters and the data, and is obtained based on a plurality of experimental fractures defined in the reservoir. Effects of the fracture are then emulated by selectively modifying the reservoir model using the modification parameters to generate a modified reservoir model. The reservoir is then modeled with the fracture by using the modified reservoir model to generate a result.

19 Claims, 11 Drawing Sheets

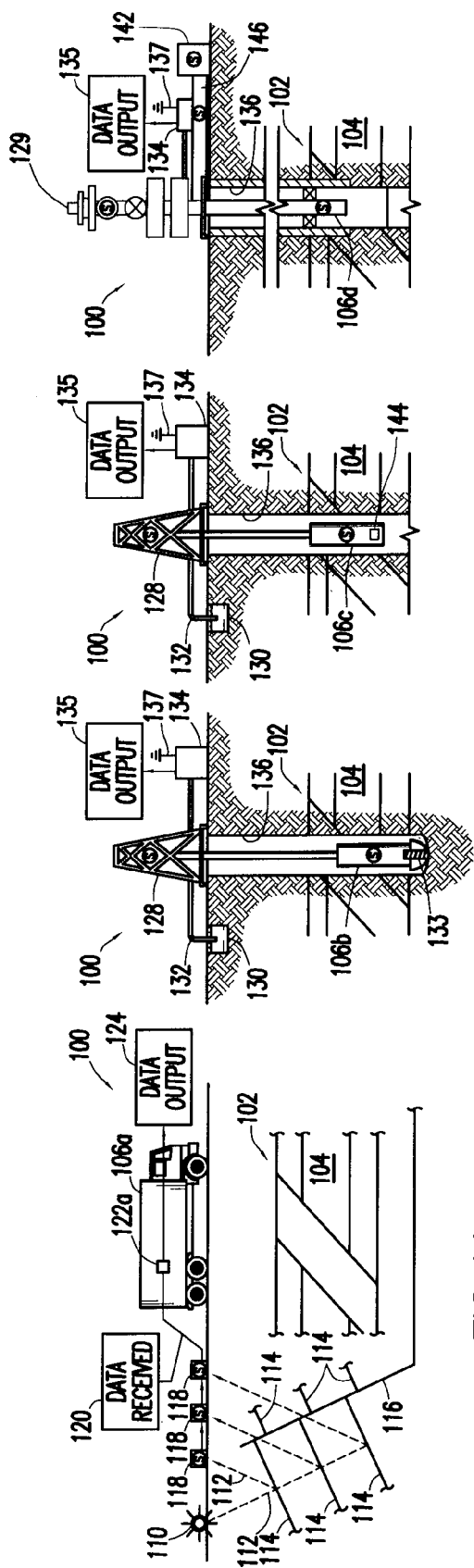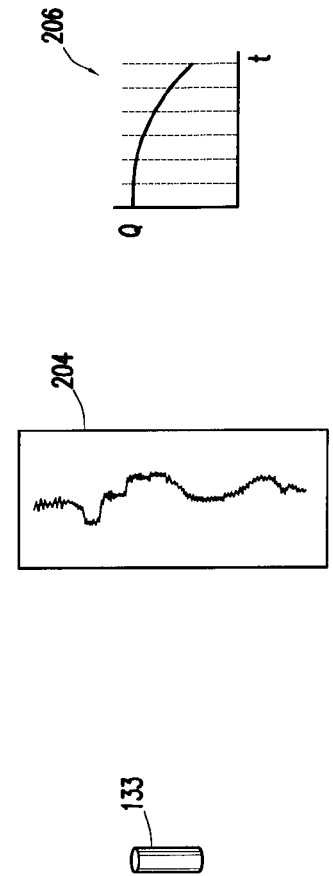

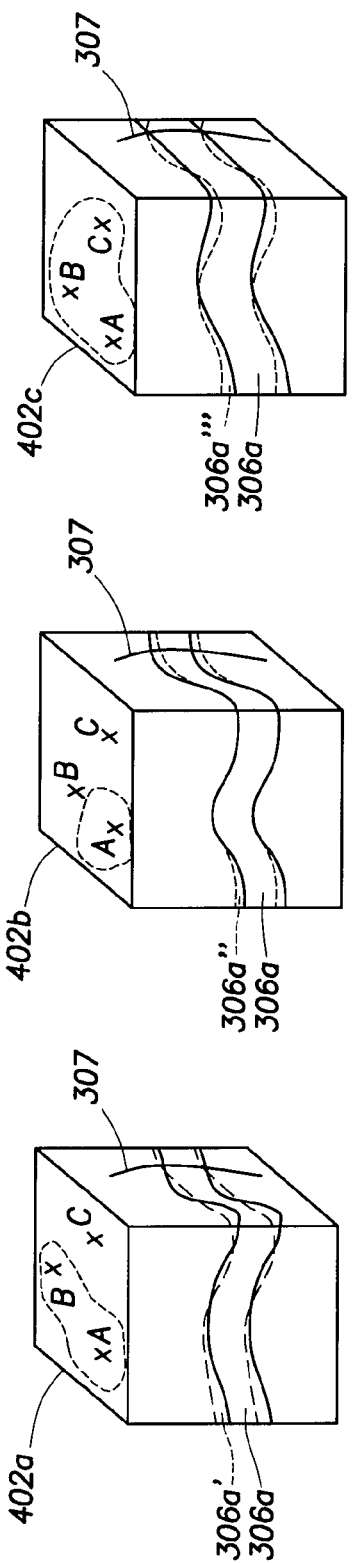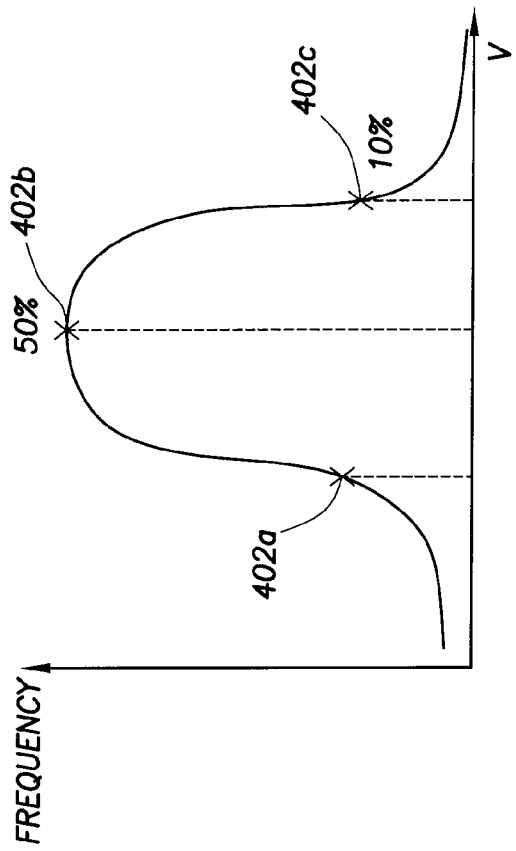

RESERVOIR FRACTURE SIMULATION

CROSS REFERENCE TO RELATED APPLICATION

This application claims priority pursuant to 35 U.S.C. §119 (e), to the filing date of U.S. Patent Application Ser. No. 60/984,704 entitled "SYSTEM AND METHOD FOR PERFORMING OILFIELD OPERATIONS," filed on Nov. 1, 2007, which is hereby incorporated by reference in its entirety.

BACKGROUND

Operations, such as surveying, drilling, wireline testing, completions, production, planning and analysis, are typically performed to locate and gather valuable downhole fluids. Surveys of geological formations are often performed using acquisition methodologies, such as seismic scanners or surveyors to generate maps of underground formations (e.g., reservoirs). These formations are often analyzed to determine the presence of subterranean assets, such as valuable fluids or minerals. This information is used to assess the underground formations and locate the formations containing the desired subterranean assets. This information may also be used to determine whether the formations have characteristics suitable for storing fluids. Data collected from the acquisition methodologies may be evaluated and analyzed to determine whether such valuable assets are present, and if they are reasonably accessible.

SUMMARY

One example implementation of reservoir fracture simulation relates to a method of evaluating a reservoir. This includes obtaining data comprising properties of the reservoir and properties of a fracture in the reservoir. Modification parameters of a reservoir model of the reservoir are determined based on the data using a correlation matrix corresponding to an empirical functional relationship between the modification parameters and the data, with the correlation matrix being obtained based on a plurality of experimental fractures defined in the reservoir. Effects of the fracture are emulated by selectively modifying the reservoir model using the modification parameters to generate a modified reservoir model. The reservoir is modeled with the fracture using the modified reservoir model to generate a result.

Other aspects of reservoir fracture simulation will be apparent from the following description and the appended claims.

BRIEF DESCRIPTION OF THE DRAWINGS

A description of several embodiments of reservoir fracture simulation may be had by reference to the embodiments thereof that are illustrated in the appended drawings. It is to be noted, however, that the appended drawings illustrate only example embodiments of this invention and are therefore not to be considered limiting of their scope, for reservoir fracture simulation may admit to other equally effective embodiments.

FIGS. 1A-1D show example schematic views of an oilfield having subterranean structures including reservoirs therein and various operations being performed on the reservoirs.

FIGS. 2A-2D are example graphical depictions of data collected by the tools of FIGS. 1A-1D, respectively.

FIGS. 4A-4C are schematic, 3D views of static models based on the data acquired by the data acquisition tools of FIG. 3.

FIG. 5 is graphical representation of a probability plot of the static models of FIG. 4.

DETAILED DESCRIPTION

Figure 3:
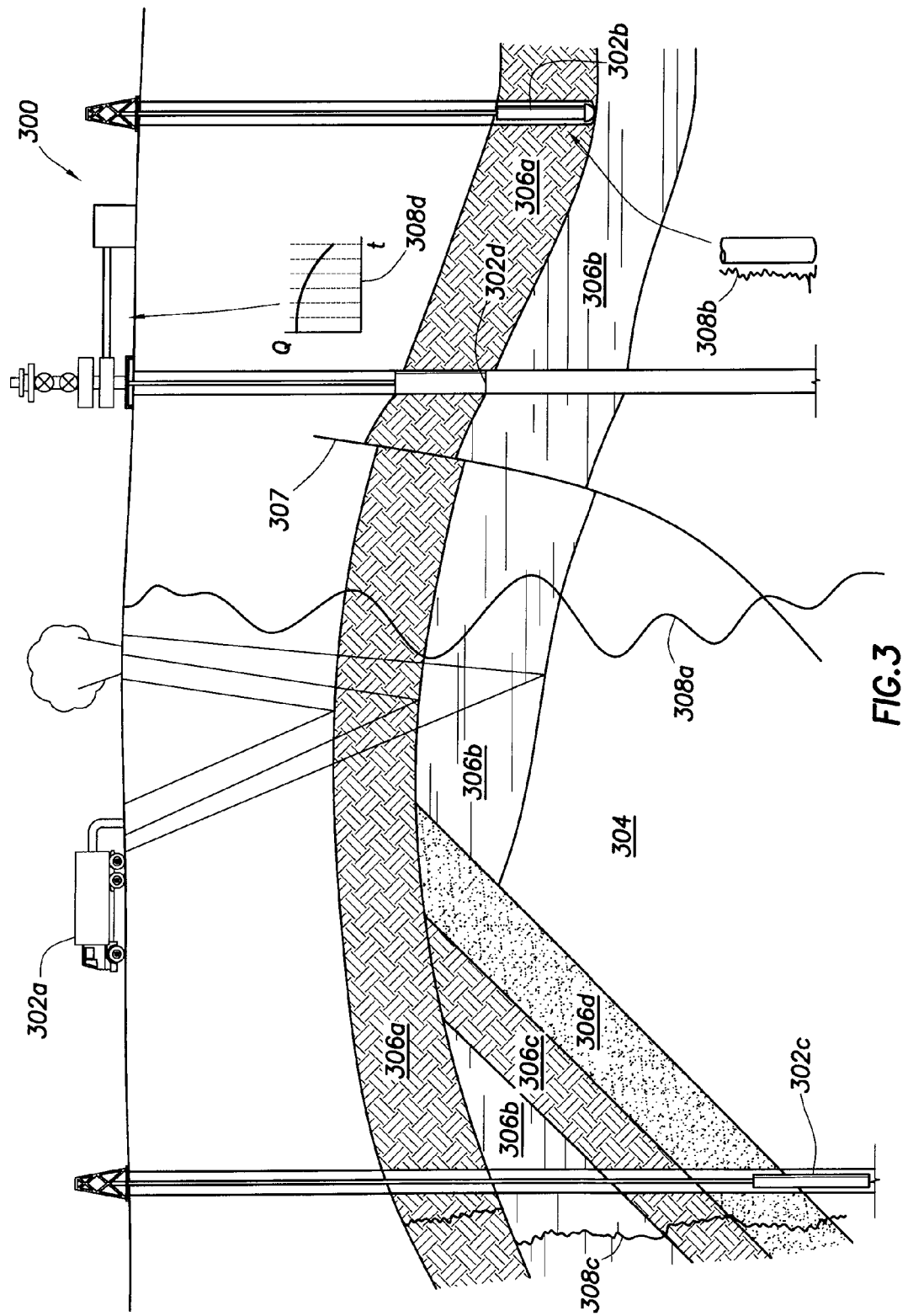
FIG. 3 shows an example schematic view, partially in cross section, of an oilfield having a plurality of data acquisition tools positioned at various locations along the oilfield for collecting data from the subterranean formation.

Example embodiments of reservoir fracture simulation are shown in the above-identified figures and described in detail below. In describing the embodiments, like or identical reference numerals are used to identify common or similar elements. The figures are not necessarily to scale and certain features and certain views of the figures may be shown exaggerated in scale or in schematic in the interest of clarity and conciseness.

In general, reservoir fracture simulation is directed to simulating a fracture in a reservoir. Fracture simulations can be used in a variety of models of the reservoir, and can increase the efficiency and accuracy of such models.

FIGS. 1A-1D depict simplified, representative, schematic views of an oilfield (100) having subterranean formation (102) containing reservoir (104) therein and depicting various operations being performed on the oilfield (100). FIG. 1A depicts a survey operation being performed by a survey tool, such as seismic truck (106a) to measure properties of the subterranean formation. The survey operation is a seismic survey operation for producing sound vibrations (112). In FIG. 1A, one such sound vibration (112) generated by a source (110) and reflects off a plurality of horizons (114) in an earth formation (116). The sound vibration(s) (112) is (are) received in by sensors (S), such as geophone-receivers (118), situated on the earth's surface, and the geophone-receivers (118) produce electrical output signals, referred to as data received (120) in FIG. 1A.

In response to the received sound vibration(s) (112) representative of different parameters (such as amplitude and/or frequency) of the sound vibration(s) (112), the geophones (118) produce electrical output signals containing data concerning the subterranean formation (102). The data received (120) is provided as input data to a computer (122a) of the seismic truck (106a), and responsive to the input data, the computer (122a) generates a seismic data output record (124). The seismic data may be stored, transmitted or further processed as desired, for example by data reduction.

FIG. 1B depicts a drilling operation being performed by a drilling tools (106b) suspended by a rig (128) and advanced into the subterranean formations (102) to form a wellbore (136). A mud pit (130) is used to draw drilling mud into the drilling tools (106b) via flow line (132) for circulating drilling mud through the drilling tools (106b), up the wellbore and back to the surface. The drilling tools (106b) are advanced into the subterranean formations (102) to reach reservoir (104). Each well may target one or more reservoirs. The drilling tools (106b) are preferably adapted for measuring downhole properties using logging while drilling tools (106b). The logging while drilling tool (106b) may also be adapted for taking a core sample (133) as shown, or removed so that a core sample (133) may be taken using another tool.

A surface unit (134) is used to communicate with the drilling tools (106b) and/or offsite operations. The surface unit (134) is capable of communicating with the drilling tools (106b) to send commands to the drilling tools (106b) and to receive data therefrom. The surface unit (134) is preferably provided with computer facilities for receiving, storing, processing, and/or analyzing data from the oilfield (100). The surface unit (134) collects data generated during the drilling operation and produces data output (135) which may be stored or transmitted. Computer facilities, such as those of the surface unit (134), may be positioned at various locations about the oilfield (100) and/or at remote locations.

Sensors (S), such as gauges, may be positioned about the oilfield to collect data relating to various oilfields operations as described previously. As shown, the sensor (S) is positioned in one or more locations in the drilling tools and/or at the rig to measure drilling parameters, such as weight on bit, torque on bit, pressures, temperatures, flow rates, compositions, rotary speed and/or other parameters of the operation. Sensor (S) may also be positioned in one or more locations in the circulating system.

The data gathered by the sensors (S) may be collected by the surface unit (134) and/or other data collection sources for analysis or other processing. The data collected by the sensors (S) may be used alone or in combination with other data. The data may be collected in one or more databases and/or all or transmitted onsite or offsite. All or select portions of the data may be selectively used for analyzing and/or predicting operations of the current and/or other wellbores, including the reservoir. The data may be may be historical data, real time data, or combinations thereof. The real time data may be used in real time, or stored for later use. The data may also be combined with historical data or other inputs for further analysis. The data may be stored in separate databases or combined into a single database.

The collected data may be used to perform analysis, such as modeling operations. For example, the seismic data output may be used to perform geological, geophysical, and/or reservoir engineering. The reservoir, wellbore, surface and/or process data may be used to perform reservoir, wellbore, geological, geophysical or other simulations. The data outputs from the operation may be generated directly from the sensors (S), or after some preprocessing or modeling. These data outputs may act as inputs for further analysis.

The data is collected and stored at the surface unit (134). One or more surface units (134) may be located at the oilfield (100), or connected remotely thereto. The surface unit (134) may be a single unit, or a complex network of units used to perform the necessary data management functions throughout the oilfield (100). The surface unit (134) may be a manual or automatic system. The surface unit (134) may be operated and/or adjusted by a user.

The surface unit (134) may be provided with a transceiver (137) to allow communications between the surface unit (134) and various portions of the oilfield (100) or other locations. The surface unit (134) may also be provided with or functionally connected to one or more controllers for actuating mechanisms at the oilfield (100). The surface unit (134) may then send command signals to the oilfield (100) in response to data received. The surface unit (134) may receive commands via the transceiver or may itself execute commands to the controller. A processor (not shown) may be provided to analyze the data (locally or remotely) and make the decisions and/or actuate the controller. In this manner, the oilfield (100) may be selectively adjusted based on the data collected. This technique may be used to optimize portions of the operation, such as controlling drilling, weight on bit, pump rates or other parameters. These modifications may be made automatically based on computer protocol, and/or manually by an operator. In some cases, well plans may be adjusted to select optimum operating conditions, or to avoid problems.

FIG. 1C depicts a wireline operation being performed by a wireline tool (106c) suspended by the rig (128) and into the wellbore (136) of FIG. 1B. The wireline tool (106c) is preferably adapted for deployment into a wellbore (136) for generating well logs, performing downhole tests and/or collecting samples. The wireline tool (106c) may be used to provide another method and apparatus for performing a seismic survey operation. The wireline tool (106c) of FIG. 1C may, for example, have an explosive, radioactive, electrical, or acoustic energy source (144) that sends and/or receives electrical signals to the surrounding subterranean formations (102) and fluids therein.

The wireline tool (106c) may be operatively connected to, for example, the geophones (118) stored in the computer (122a) of the seismic truck (106a) of FIG. 1A. The wireline tool (106c) may also provide data to the surface unit (134). The surface unit (134) collects data generated during the wireline operation and produces data output (135) that may be stored or transmitted. The wireline tool (106c) may be positioned at various depths in the wellbore (136) to provide a survey or other information relating to the subterranean formation (102).

Sensors (S), such as gauges, may be positioned about the oilfield to collect data relating to various operations as described previously. As shown, the sensor (S) is positioned in the wireline tool (106c) to measure downhole parameters, which relate to, for example porosity, permeability, fluid composition, and/or other parameters of the operation.

FIG. 1D depicts a production operation being performed by a production tool (106d) deployed from a production unit or christmas tree (129) and into the completed wellbore (136) of FIG. 1C for drawing fluid from the downhole reservoirs into the surface facilities (142). Fluid flows from reservoir (104) through perforations in the casing (not shown) and into the production tool (106d) in the wellbore (136) and to the surface facilities (142) via a gathering network (146).

Sensors (S), such as gauges, may be positioned about the oilfield to collect data relating to various operations as described previously. As shown, the sensor (S) may be positioned in the production tool (106d) or associated equipment, such as the Christmas tree (129), gathering network (146), surface facilities (142) and/or the production facility, to measure fluid parameters, such as fluid composition, flow rates, pressures, temperatures, and/or other parameters of the production operation.

While only simplified wellsite configurations are shown, it will be appreciated that the oilfield may cover a portion of land, sea and/or water locations that hosts one or more wellsites. Production may also include injection wells (not shown) for added recovery. One or more gathering facilities may be operatively connected to one or more of the wellsites for selectively collecting downhole fluids from the wellsite(s).

While FIGS. 1B-1D depict tools used to measure properties of an oilfield (100), it will be appreciated that the tools may be used in connection with non-oilfield operations, such as mines, aquifers, storage or other subterranean facilities. Also, while certain data acquisition tools are depicted, it will be appreciated that various measurement tools capable of sensing parameters, such as seismic two-way travel time, density, resistivity, production rate, etc., of the subterranean formation (102) and/or its geological formations may be used. Various sensors (S) may be located at various positions along the wellbore and/or the monitoring tools to collect and/or monitor the desired data. Other sources of data may also be provided from offsite locations.

The oilfield configurations in FIGS. 1A-1D are intended to provide a brief description of an example of an oilfield usable with reservoir fracture simulation. Part, or all, of the oilfield (100) may be on land and/or sea. Also, while a single oilfield measured at a single location is depicted, reservoir fracture simulation may be used with any combination of one or more oilfields (100), one or more processing facilities, and one or more wellsites.

FIGS. 2A-2D are graphical depictions of examples of data collected by the tools of FIGS. 1A-D, respectively. FIG. 2A depicts a seismic trace (202) of the subterranean formation of FIG. 1A taken by seismic truck (106a). The seismic trace may be used to provide data, such as a two-way response over a period of time. FIG. 2B depicts a core sample (133) taken by the drilling tools (106b). The core sample (133) may be used to provide data, such as a graph of the density, porosity, permeability or other physical property of the core sample (133) over the length of the core. Tests for density and viscosity may be performed on the fluids in the core at varying pressures and temperatures. FIG. 2C depicts a well log (204) of the subterranean formation (102) of FIG. 1C taken by the wireline tool (106c). The wireline log typically provides a resistivity or other measurement of the formations at various depths. FIG. 2D depicts a production decline curve or graph (206) of fluid flowing through the subterranean formation (102) of FIG. 1D measured at the surface facilities (142). The production decline curve (206) typically provides the production rate (Q) as a function of time (t)

The respective graphs of FIGS. 2A-2C depict examples of static measurements that may describe information about the physical characteristics of the formation and reservoirs contained therein. These measurements may be analyzed to better define the properties of the formation(s) and/or determine the accuracy of the measurements and/or for checking for errors. The plots of each of the respective measurements may be aligned and scaled for comparison and verification of the properties.

FIG. 2D depicts an example of a dynamic measurement of the fluid properties through the wellbore. As the fluid flows through the wellbore, measurements are taken of fluid properties, such as flow rates, pressures, composition, etc. As described below, the static and dynamic measurements may be analyzed and used to generate models of the subterranean formation to determine characteristics thereof. Similar measurements may also be used to measure changes in formation aspects over time.

FIG. 3 depicts a schematic view, partially in cross section, of an oilfield (300) having data acquisition tools (302a), (302b), (302c), and (302d) positioned at various locations along the oilfield for collecting data of a subterranean formation (304). The data acquisition tools (302a-302d) may be the same as data acquisition tools (106a-106d) of FIGS. 1A-1D, respectively, or others not depicted. As shown, the data acquisition tools (302a-302d) generate data plots or measurements (308a-308d), respectively. These data plots are depicted along the oilfield to demonstrate the data generated by various operations.

Data plots (308a-308c) are examples of static data plots that may be generated by the data acquisition tools (302a-302d), respectively. Static data plot (308a) is a seismic two-way response time and may be the same as the seismic trace (202) of FIG. 2A. Static plot (308b) is core sample data measured from a core sample of the formation (304), similar to the core sample (133) of FIG. 2B. Static data plot (308c) is a logging trace, similar to the well log (204) of FIG. 2C. Production decline curve or graph (308d) is a dynamic data plot of the fluid flow rate over time, similar to the graph (206) of FIG. 2D. Other data may also be collected, such as historical data, user inputs, economic information, and/or other measurement data and other parameters of interest.

The subterranean formation (304) has a plurality of geological formations (306a-306d). As shown, the structure has several formations or layers, including a shale layer (306a), a carbonate layer (306b), a shale layer (306c), and a sand layer (306d). A fault line (307) extends through the layers (306a, 306b). The static data acquisition tools are preferably adapted to take measurements and detect the characteristics of the formations.

While a specific subterranean formation (304) with specific geological structures is depicted, it will be appreciated that the oilfield may contain a variety of geological structures and/or formations, sometimes having extreme complexity. In some locations, typically below the water line, fluid may occupy pore spaces of the formations. Each of the measurement devices may be used to measure properties of the formations and/or its geological features. While each acquisition tool is shown as being in specific locations in the oilfield, it will be appreciated that one or more types of measurement may be taken at one or more location across one or more oilfields or other locations for comparison and/or analysis.

The data collected from various sources, such as the data acquisition tools of FIG. 3, may then be processed and/or evaluated. Typically, seismic data displayed in the static data plot (308a) from the data acquisition tool (302a) is used by a geophysicist to determine characteristics of the subterranean formations (304) and features. Core data shown in static plot (308b) and/or log data from the well log (308c) is typically used by a geologist to determine various characteristics of the subterranean formation (304). Production data from the graph (308d) is typically used by the reservoir engineer to determine fluid flow reservoir characteristics. The data analyzed by the geologist, geophysicist, and the reservoir engineer may be analyzed using modeling techniques. Examples of modeling techniques are described in Patent/Publication/Application No. U.S. Pat. No. 5,992,519, WO2004/049216, WO1999/064896, U.S. Pat. No. 6,313,837, US2003/0216897, U.S. Pat. No. 7,248,259, US2005/0149307 and US2006/0197759. Systems for performing such modeling techniques are described, for example, in issued U.S. Pat. No. 7,248,259, the entire contents of which are hereby incorporated by reference.

FIG. 4A-4C depict three-dimensional graphical representations of the subsurface referred to as a static model. The static model may be generated based on one or more of the models generated from, for example, the data gathered using acquisition tools (302a-302d). In the figures provided, the static models (402a-402c) are generated by the data acquisition tools (302a-302c) of FIG. 3, respectively. These static models may provide a bi-dimensional view of the subterranean formation, based on the data collected at the given location.

The static models may have different accuracies based on the types of measurements available, quality of data, location and other factors. While the static models of FIGS. 4A-4C are taken using certain data acquisition tools at a single location of the oilfield, one or more of the same or different data acquisition tools may be used to take measurements at one or more locations throughout the oilfield to generate a variety of models. Various analysis and modeling techniques may be selected depending on the desired data type and/or location.

Each of the static models (402a-402c) is depicted as volumetric representations of an oilfield with one or more reservoirs, and the surrounding formation structures. These volumetric representations are a prediction of the geological structure of the subterranean formation at the specified location based upon available measurements. Preferably, the representations are probable scenarios, created using the same input data (historical and/or real time), but having differing interpretation, interpolation, and modeling techniques. As shown, the models contain geological layers within the subterranean formation. In particular, fault (307) of FIG. 3 extends through each of the models. Each static model also has reference points A, B, and C located at specific positions along each of the static models. These static models and the specific reference points of the static models may be analyzed. For example, a comparison of the different static models may show differences in the structure of fault (307) and the adjacent layer. Each of the reference points may assist in the comparison between the various static models. Modifications may be made to the models based on an analysis of the various static models in FIGS. 4A-4C, and an adjusted formation layer may be generated as is described further below.

FIG. 5 depicts graphical representation of a probability plot of multiple static models, such as the models (402a)-(402c) of FIGS. 4A-4C. The graph depicts a range of reservoir attribute value (V), such as volumetrics, production rate, gross rock thickness, net pay, cumulative production, etc. The value(V) of the reservoir attribute can vary due to any static or dynamic component(s) being assessed, such as structure, porosity, permeability, fluid contact levels, etc. The variables are typically constrained in the modeling exercise to be within reasonable predictions of what the real reservoir(s) are capable of, or what has been observed in similar reservoirs. This graph is a histogram showing multiple model realizations that may be generated by the provided data. The variable results may be generated by varying multiple model parameters. The graph may then be generated by reviewing and estimating the probability of the models generated and plotting them.

As shown, all the model realizations that make up the distribution graph are equally probable in geological terms. The histogram indicates that static model (402a) provides a ninety percent probability of having at least that amount of variable (V). The histogram as shown also indicates that static model (402b) has a fifty percent probability of having at least that amount of variable (V), and static model (402c) a ten percent probability of having this higher amount. This graph suggests that static model (402c) is the more optimistic model estimate of variable (V). The static models and their associated likelihoods may be used, for example, in determining field development plans and surface facility production schemes. Combinations of static model representations, for example (402a) through (402c), are considered and analyzed to assess the risk and/or economic tolerance of field development plans.

Referring back to the static models of FIGS. 4A-4C, the models have been adjusted based on the dynamic data provided in the production of the graph (308d) of FIG. 3. The dynamic data either collected by data acquisition tool or predicted using modeling techniques, (302d) is applied to each of the static models (402a)-(402c). As shown, the dynamic data indicates that the fault (307) and layer (306a) as predicted by the static models may need modification. The layer (306a) has been adjusted in each model as shown by the dotted lines. The modified layer is depicted as (306a'), (306a'') and (306a''') for the static models of FIGS. 4A-4C, respectively.

The dynamic data may indicate that certain static models provide a better representation of the oilfield. A static model's ability to match historical production rate data may be considered a good indication that it may also give accurate predictions of future production. In one possible implementation, a preferred static model may be selected. In this case, while the static model of FIG. 4C may have the highest overall probability of accuracy based solely on the static model as shown in FIG. 5, an analysis of the dynamic model suggests that model of FIG. 4B is a better match. As shown in FIG. 4A-4C, a comparison of layers (306a) with layers (306a'), (306a'') and (306a''') indicates that fault (307) with associated fluid transmissibility across the fault most closely matches the prediction provided by static model (402b).

In this example, the selected static model (402b) is modified based on the dynamic data. The resulting adjusted model (402b') has been adjusted to better match the production data. As shown, the position of the geological structure (306a) has been shifted to (306a'') to account for the differences shown by the dynamic data. As a result, the static model may be adapted to better fit both the static and dynamic models.

In determining the best overall model, the static and/or dynamic data may be considered. In this case, when considering both the static and dynamic data, the static model (402b) of FIG. 4B is selected as the earth model with the highest probability of accuracy based on both the static probabilities and dynamic input. To obtain the best overall model, it may be desirable to consider the static and dynamic data from multiple sources, locations, and/or types of data.

The evaluation of the various static and dynamic data of FIG. 3 involves considerations of static data, such as seismic data considered by a geophysicist (308a), geological data considered by a geologist (308b, 308c), and production data considered by a reservoir engineer (308d). Each individual typically considers data relating to a specific function and provides models based on this specific function. However, as depicted in FIGS. 4A-C, information from each of the separate models may affect the decision on the best overall earth model. Moreover, information from other models or sources may also affect modifications to the model and/or selection of the best overall earth model. The earth model generated as described in FIGS. 4A-5 is a basic earth model determined from an analysis of the various models provided.

Figure 6:
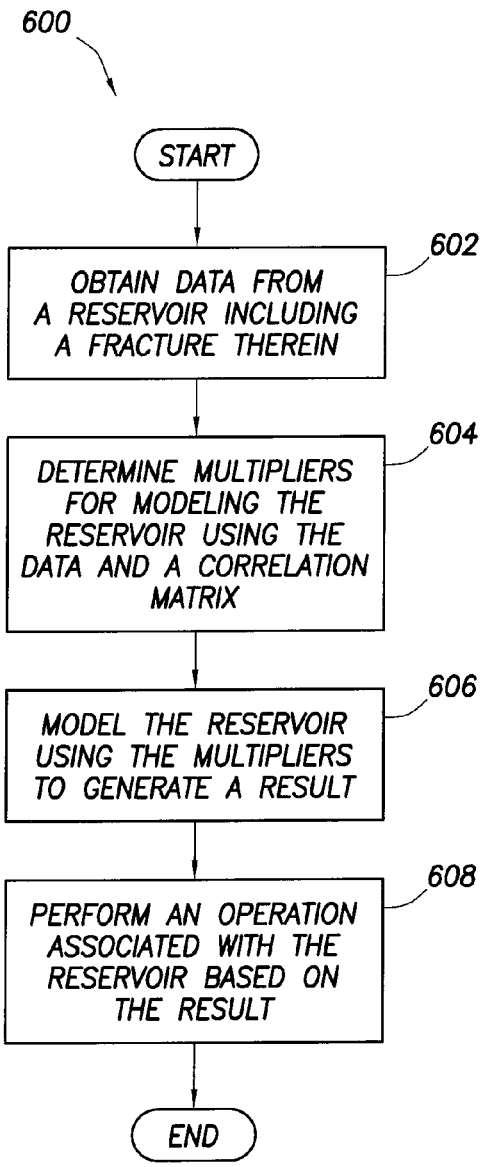
FIGS. 6-8 show flow charts describing various aspects of reservoir fracture simulation.

FIG. 6 shows a flow chart (600) describing a method of reservoir fracture simulation. The method includes obtaining data from a reservoir including a fracture therein (602). The data includes data about the reservoir (e.g., properties of the reservoir such as reservoir porosity, reservoir permeability, geometry of a coarse grid for reservoir modeling, etc.) as well as data about the fracture (e.g., properties of the fracture such as fracture porosity, fracture permeability, fracture conductivity, fracture geometry, etc.) within the reservoir. Generally speaking, the reservoir has heterogeneous properties and the data varies with location in the reservoir and the fracture.

Multipliers for modeling the reservoir are determined using the data as well as a correlation matrix (604). Here, the term "multiplier" refers to a modification parameter which may be used to modify a reservoir model based on a predetermined scheme, such as multiplying (or modifying) a value in the reservoir model using the multiplier (or the modification parameter). The term "correlation matrix" refers to a function for obtaining multipliers using the data as inputs to the function. Typically, the function is a discrete function with discrete input and output. In one or more embodiments of reservoir fracture simulation, the correlation matrix may be organized as a multi-dimensional table. In such embodiments, the data may be used as multi-dimensional inputs to look up (e.g., using an interpolation procedure) multipliers (or the modification parameter) from entries of the multi-dimensional table. The creation of the correlation matrix is discussed below in FIG. 7 and the determination of the multipliers to use in the reservoir model is described in FIG. 8.

The reservoir is then modeled using the multipliers and the data to generate a result (606). An operation associated with the reservoir may then be performed based on the result (608).

In one or more embodiments of reservoir fracture simulation, the fracture is a hydraulic fracture formed or to be formed about a wellbore in the reservoir. In one possible implementation, a reservoir model at a coarse scale is used for improving modeling efficiency (e.g., of the resources such as simulation time, computer memory, processing power, etc.) such that a large number (e.g., thousands) of wellbores may be included in modeling the reservoir at the same time. However, effects of the fracture often need to be simulated using a reservoir model at a fine scale for accuracy requirement.

In one or more embodiments of reservoir fracture simulation, effects of the fracture may be emulated by selectively modifying the reservoir model at the coarse scale using the multipliers (or the modification parameters) within a bounding box surrounding the fracture. Generally speaking, the reservoir model at the coarse scale may be created by applying properties of the reservoir (without considering properties of the fracture) to the coarse grid representing the reservoir while the reservoir model at the fine scale may be created by applying both properties of the reservoir and properties of the fracture (at least within the bounding box) to a fine grid derived from the coarse grid. In one scenario, modeling the reservoir using the multipliers includes applying the multipliers (or the modification parameters) to all coarse cells (of the coarse grid) surrounding the center cell in the bounding box.

Figure 12:
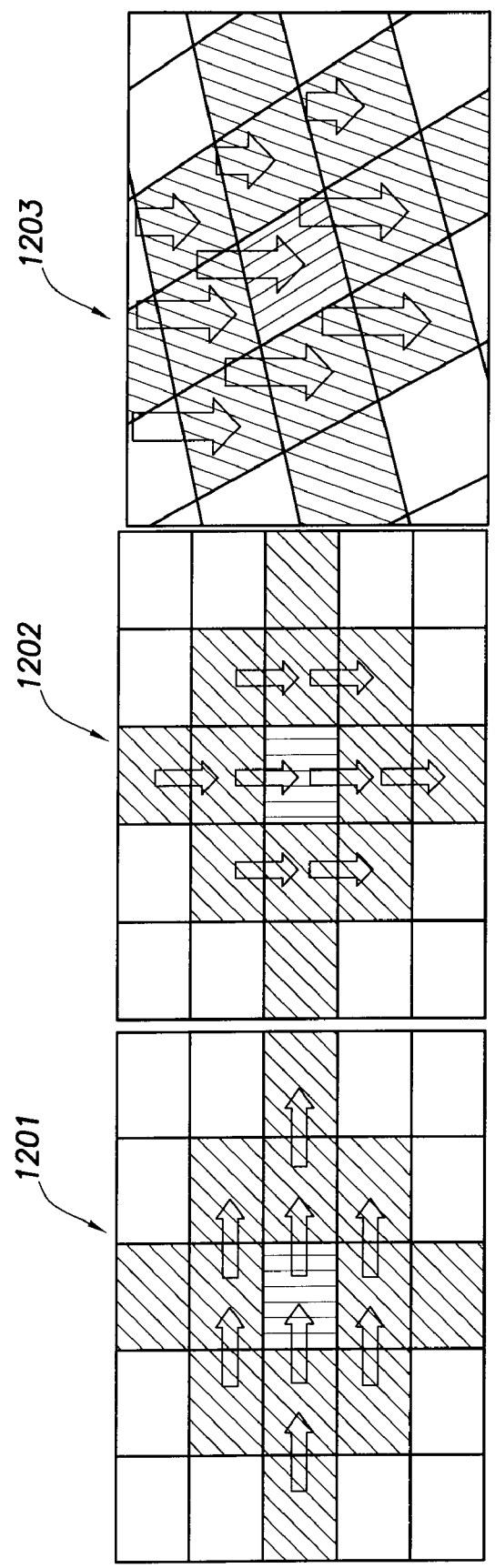
FIG. 12 shows the application of multipliers to a bounding box in accordance with another possible implementation of reservoir fracture simulation.

Referring to FIG. 12, three views (1201)-(1203) of a 2D bounding box depict arrows representing vector values of multipliers applied to the cross hatched coarse cells within the bounding box. For example, the X, Y, Z components of the vector value of each multiplier are applied to X, Y, Z component of transmissibility of the cross hatched coarse cells. In one or more embodiments of reservoir fracture simulation, the values of the multiplier may depend on the distance of the coarse cell from the center of the bounding box, for example in a linearly or exponentially decreasing manner. Though not shown in FIG. 6, the model may then be used to determine one or more oil field operations to perform, for example in production planning, completion design, etc. An example of an oil field operation is re-fracturing.

Figure 7:
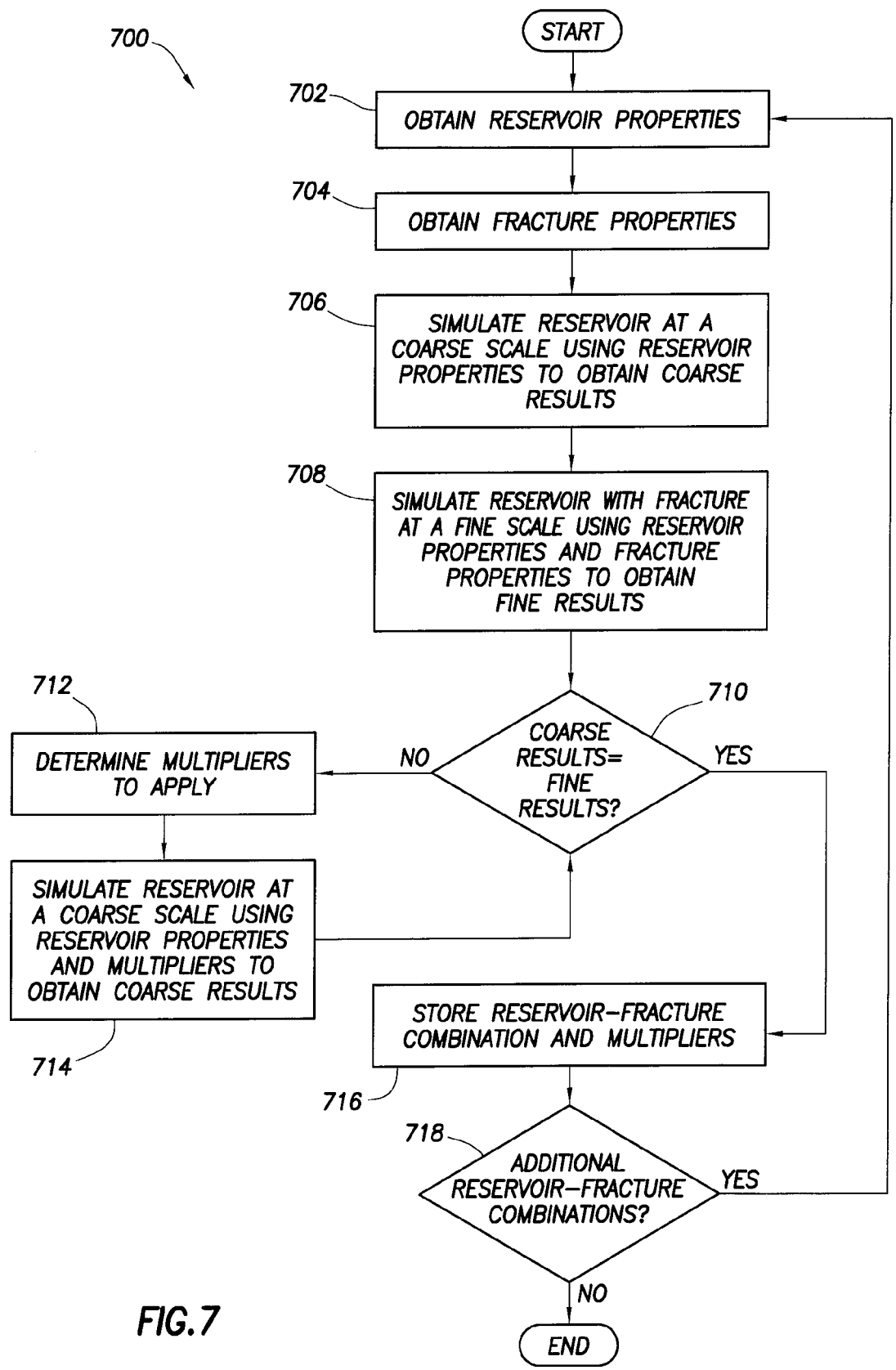

FIG. 7 shows a flow chart (700) describing a method of reservoir fracture simulation. The method describes how the correlation matrix is created. The method includes obtaining reservoir properties (702) and fracture properties (704) for a simulation experiment. Here, the reservoir properties and fracture properties may be specified by a user and/or obtained from an existing reservoir (which includes a fracture) to be used in the simulation experiment.

Typically, the creation of the correlation matrix may involve a large number (e.g., thousands) of experiments simulating the reservoir with experimental fractures of varying properties. These simulation experiments are conducted in a training phase. For each experiment, one iteration returning from block (718) to block (702) may be used. Throughout the description below regarding the simulation experiment of FIG. 7, the term "reservoir properties" refers to experimental properties of the reservoir, which is typically simplified as homogeneous throughout the reservoir. For example, representative values of real-world properties of the reservoir such as average porosity or average permeability may be used as the experimental properties throughout the reservoir for efficiency consideration in conducting the large number of experiments. In other examples, experimental properties of the reservoir may also be heterogeneous and location dependent.

In addition, the term "fracture properties" refers to experimental properties of an experimental fracture. Typically, a large number of experimental fractures with varying experimental properties may be included in the large number of simulation experiments to create the correlation matrix. For example, experimental fractures with varying sizes, conductivities, orientations, locations, etc. may be defined to cover plausible ranges of a real-world fracture in the reservoir. Further, the term "modification parameter" or "multiplier" refer to experimental modification parameter or multiplier corresponding to each of the experimental fractures.

Figure 11A:
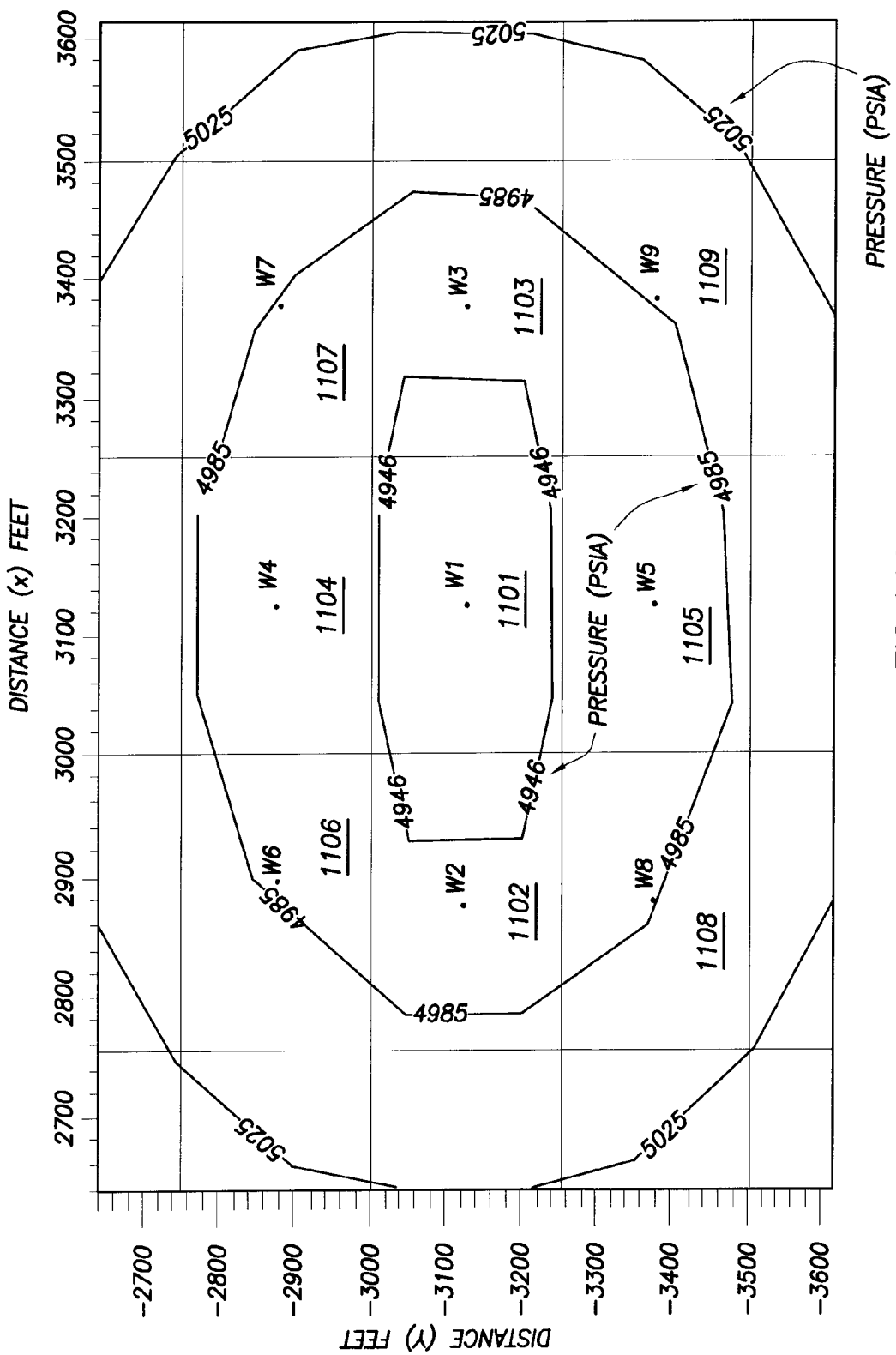
FIG. 11A shows a coarse scale simulation in accordance with yet another possible implementation of reservoir fracture simulation.

The reservoir is then simulated using the reservoir properties to obtain coarse results (706). Typically, fixed rate and/or fixed bottom hole pressure may be used as target of the simulation. In (706) the simulation is a coarse simulation (e.g., cells corresponding to 50 m$^2$ are used) and the fracture properties are not used. An example of coarse results is shown in FIG. 11A where grid block (i.e., cell) pressure contour plots are depicted over a coarse grid having coarse cells (1101) through (1109) centered at W1 through W9 around a fracture (not shown) in the cell 1101. Other examples of the coarse results may include the grid block pressure contour versus time, the wellbore pressure versus time, etc.

Figure 11B:
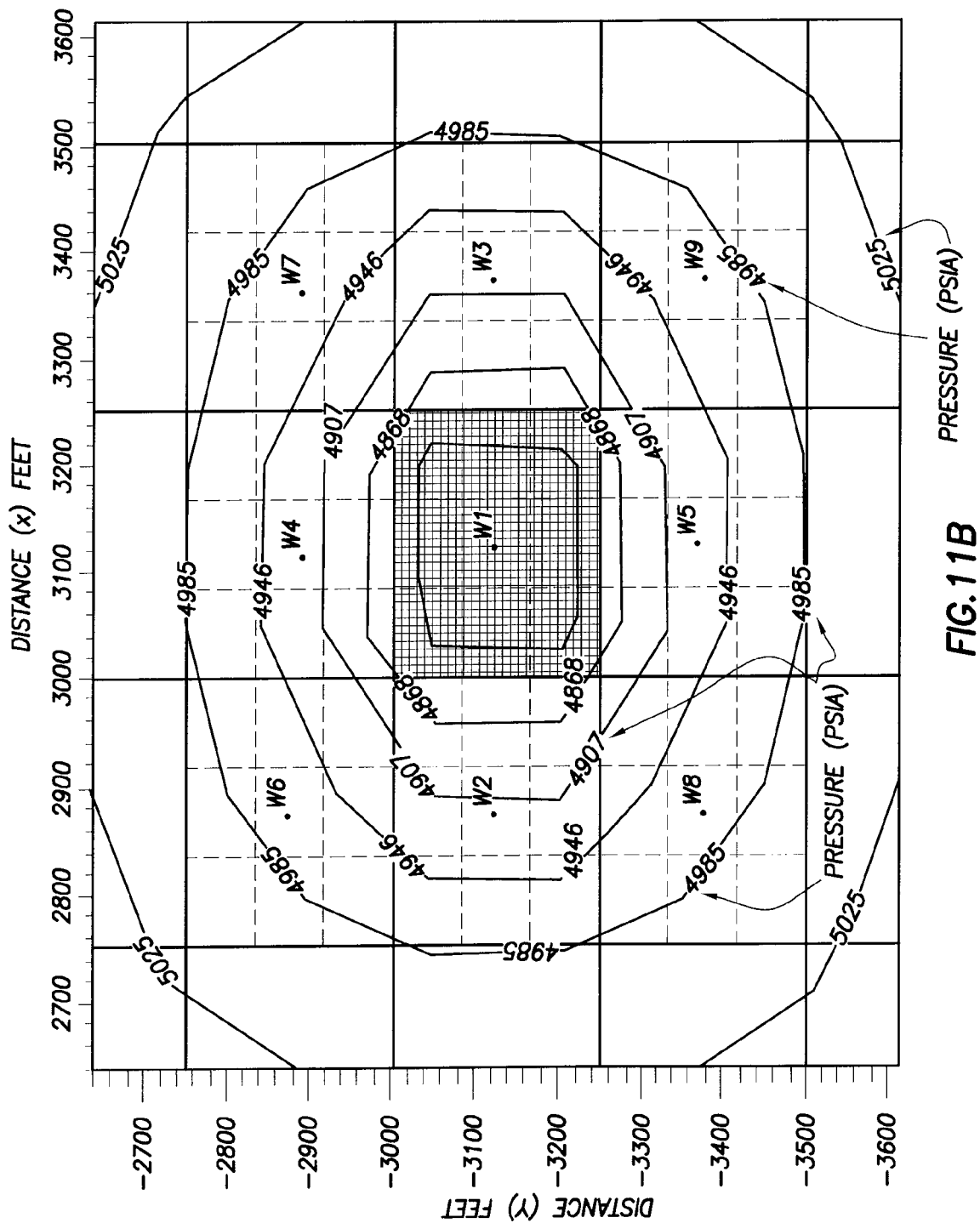
FIG. 11B shows a fine scale simulation in accordance with a possible implementation of reservoir fracture simulation.

The fracture is simulated using the fracture properties to obtain fine results (708). In (708) the simulation is a fine simulation (e.g., cells corresponding to 1 m$^2$ are used). An example of fine results is shown in FIG. 11B where grid block (i.e., cell) pressure contour plots are depicted over the same coarse grid (bolded lines) of FIG. 11A overlaying a first fine grid (dashed lines) and a second fine grid (solid lines). The first fine grid and the second fine grid may form a single fine grid with variable grid size. The terms "coarse" and "fine" are relative terms. For example, in one possible implementation, cells that are designated as "fine" may be 33 times (e.g., the second fine grid) smaller than the size of cells that are designated as "coarse." Although the examples depicted in FIGS. 11A and 11B are based on two dimensional cells and grids, those skilled in the art will appreciate that three dimensional cells and grids may also be used.

The coarse results and the fine results are then compared to determine whether the coarse results and the fine results are equal (or the difference is within a specified range) (710). If the coarse and fine results are not equal (or the difference is not within a specified range), then one or more multipliers are determined (712). The multipliers correspond to alterations in the input parameters of the coarse model. For example, the multipliers include, but are not limited to, modification parameters for modifying transmissibilities between the coarse cells and well multipliers (or well productivity index modifiers) for modifying pressure drop across a fracture perforation. As discussed above with respect to FIG. 12, the multipliers may be applied to multiple coarse cells surrounding the fracture. The reservoir is then simulated using the reservoir properties and the multipliers to obtain coarse results (714). The method then returns to (710).

If the coarse and fine results are equal (or the difference is within a specified range), then the reservoir-fracture combination is stored along with the corresponding multipliers (716). Typically, the multipliers may apply to multiple coarse cells surrounding the fracture and include, for each coarse cell, multiple multipliers applied to multiple reservoir model values such as the transmissibility multiplier and the well multiplier. A determination is made about whether there are additional reservoir-fracture combinations (i.e., for additional experiments) to simulate (718). If there are additional reservoir-fracture combinations to simulate, then the process returns to (702).

The correlation matrix, which includes reservoir-fracture combinations (i.e., combination of reservoir property and fracture property) and the corresponding multipliers may include a large number of reservoir-fracture combinations and the corresponding multipliers, for example, over 10,000. Further, the correlation matrix may be augmented to include interpolated multipliers for reservoir-fracture combinations that were not simulated. In such cases, the correlation matrix includes multipliers for both the simulated and interpolated reservoir-fracture combinations. As described above, the correlation matrix may be organized as a multi-dimensional table. In other embodiments, the correlation matrix may be organized as a file, database, hierarchical data structure, neural network, etc. where multipliers may be retrieved using reservoir-fracture combinations as inputs.

As discussed with respect to FIG. 6 above, modeling the reservoir includes determining the appropriate multipliers from the correlation matrix. The multipliers (or modification parameters) are used to modify the reservoir model at the coarse scale to emulate effects of the fracture. Throughout the description below with respect to FIG. 8, the term "reservoir properties", "fracture", "fracture properties", "modification parameters", etc. refer to real-world properties of the reservoir and a fracture formed or to be formed about a wellbore under evaluation for the operations associated with the one or more reservoirs.

Figure 8:
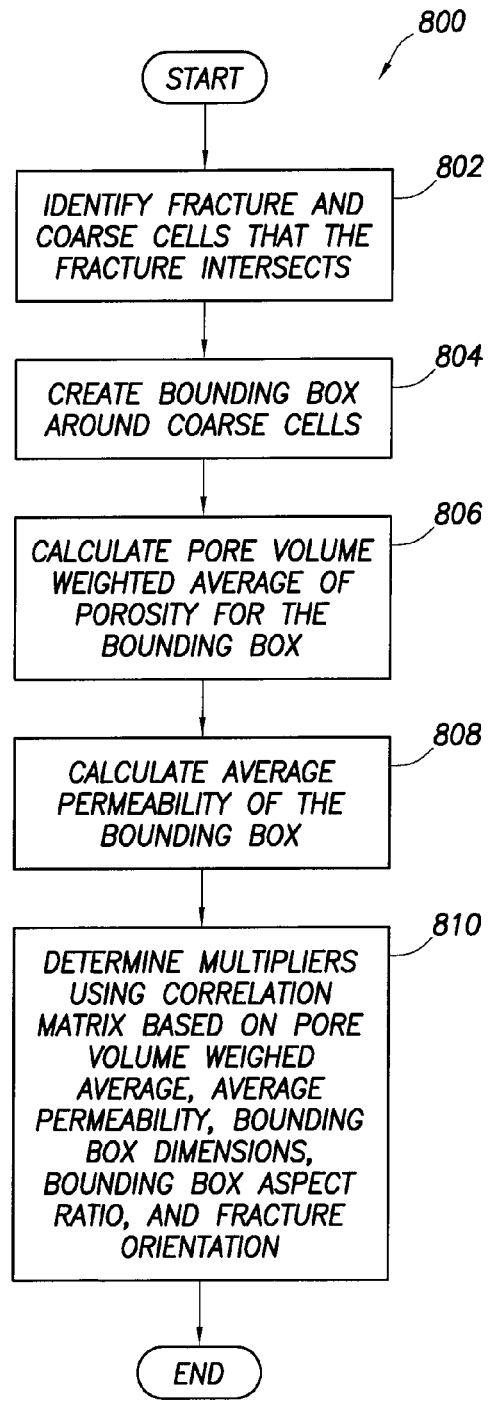

FIG. 8 shows a flow chart (800) describing a method for determining the appropriate multipliers (or modification parameters) from the correlation matrix. Both the fracture and the coarse cells that intersect the fracture in the reservoir model at the coarse scale are identified (802). Identifying the fracture may include using a 2D well section in a well log (see FIG. 9) and/or using a 3D well section in a 3D plot of the reservoir (see FIG. 10). In one scenario, the 2D well section is used to identify the fracture relative to geological features present in the 3D well section. Further, the 3D well section is used to identify the geological features in the reservoir. The 3D well section is further used to allow identify the coarse cells which the fracture intersects.

Figure 9:
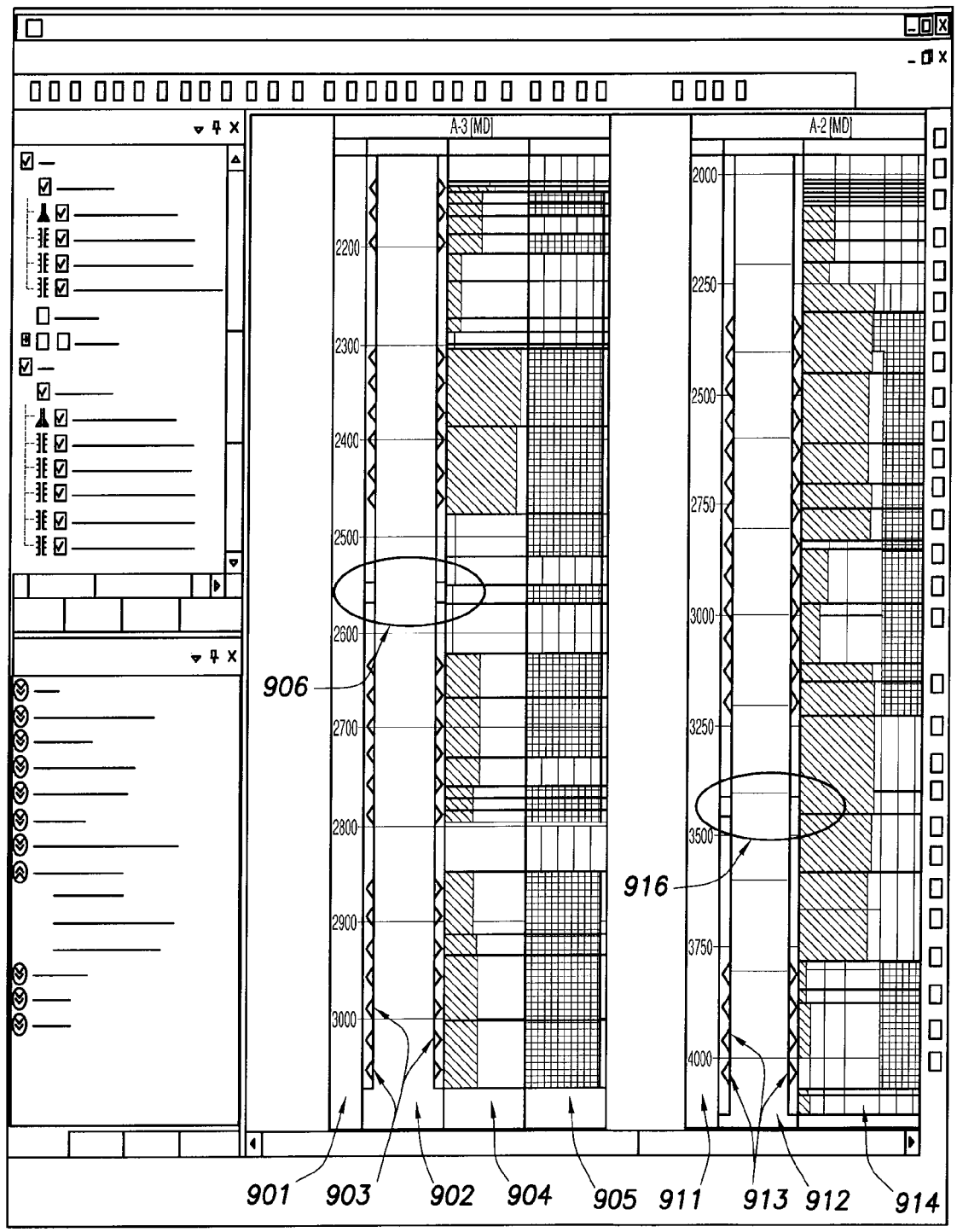
FIG. 9 shows a 2D well section in accordance with one possible implementation of reservoir fracture simulation.

As shown in FIG. 9, 2D well section (903) is marked by measured depth (901) and associated with well log parameters (904) and (905) where location (906) is identified as a fracture to be evaluated among other fractures (903). Fracture at location (906) may be already formed or to be formed. In addition, 2D well section (913) is marked by measured depth (911) and associated with well log parameters (914) where location (916) is identified as a fracture to be evaluated among other fractures (913). Fracture at location (916) may be already formed or to be formed.

Figure 10:
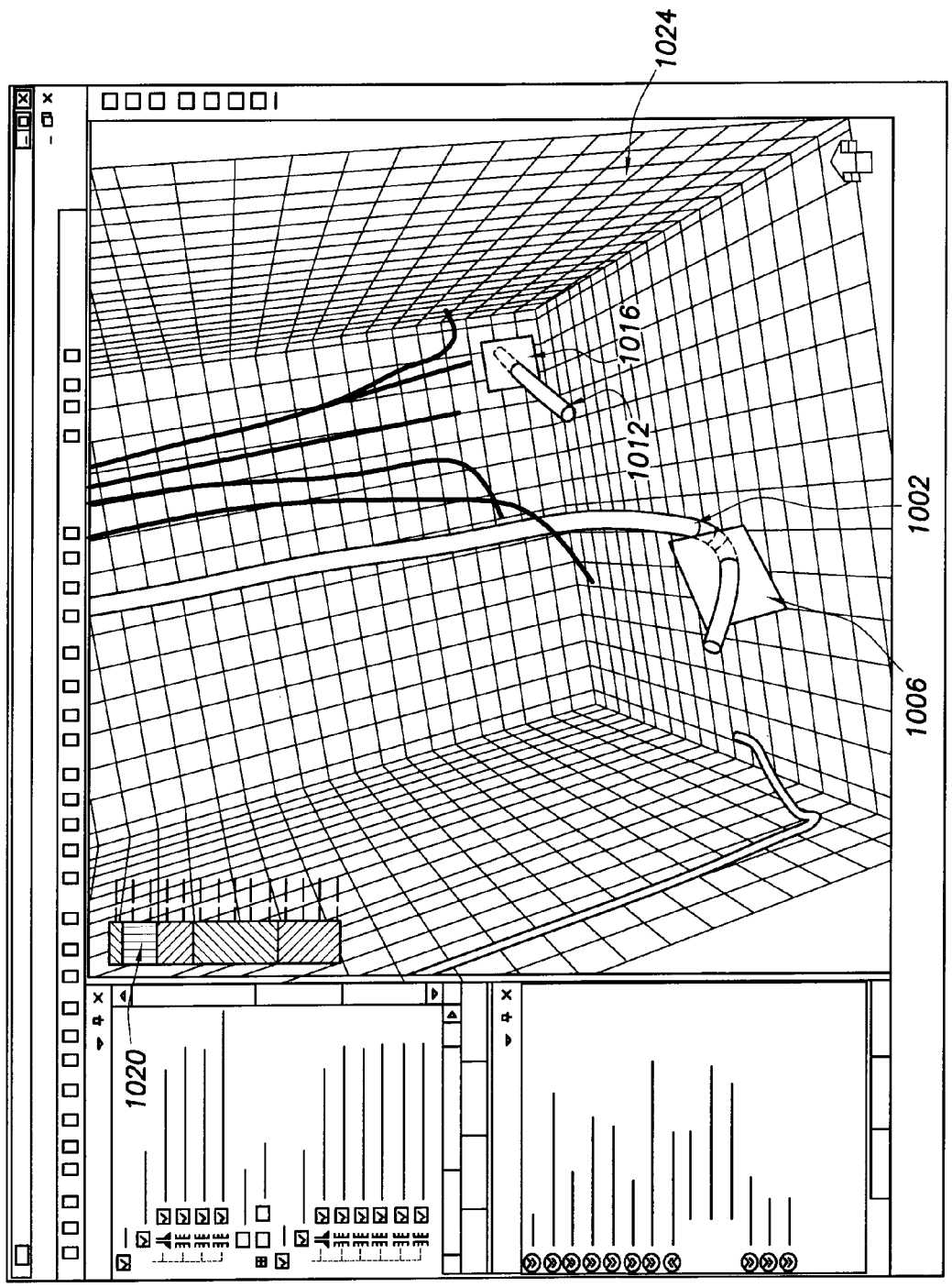
FIG. 10 shows a 3D well section in accordance with another possible implementation of reservoir fracture simulation.

As shown in FIG. 10, 3D well sections (1002) and (1012) as well as fractures (1006) and (1016) are depicted among the coarse grid (1021) of the reservoir and correspond to 2D well sections (902) and (912) as well as fractures (906) and (916), respectively. Rendering patterns based on rendering legend (1020) for marking the measured depth along the wellbores of the 3D well sections and the geological features that typically exist throughout the reservoir are not shown in FIG. 10 for clarity.

As shown in FIGS. 9 and 10, fractures (e.g., (1006) and (1016)) can be substantially vertical. Once the fractures are identified, fracture properties such as dimensions, orientation, aspect ratio, location, etc. as well as coarse cells intersecting the fractures may be obtained in FIG. 10 with respect to the coarse grid (1021) while fracture properties such as porosity, permeability, conductivity, etc. may be obtained from the well log associated with the 2D well section (902) and (912) in FIG. 9.

Returning to FIG. 8, as discussed above, properties of the reservoir and the fracture can be heterogeneous and location dependent while the experimental properties of the reservoir and experimental fractures stored in the correlation matrix may be simplified as homogeneous throughout the reservoir and the fracture. Therefore, representative values of the real-world reservoir properties and fracture properties need to be used for determining multipliers using the correlation matrix. In one or more embodiments of reservoir fracture simulation, a bounding box (for example, a 2D rectangular box or a 3D rectangular cube) is created, which surrounds/encompasses the coarse cells which the fracture intersects (804). The pore volume weighted average of the porosity is calculated for the bounding box (806). The average permeability of the bounding box is calculated (e.g., in three dimensions for the 3D bounding cube) (808).

The multipliers (or modification parameters) are determined from the correlation matrix using combination of real-world reservoir properties and fracture properties such as pore volume weighed average, average permeability, bounding box dimensions, bounding box aspect ratio, and fracture orientation (810). In one scenario, the reservoir-fracture combination stored in the correlation matrix that matches the aforementioned real-world values is identified and the multipliers associated with the reservoir-fracture combination are determined to be the multipliers. In one or more embodiments of reservoir fracture simulation, the aforementioned real-world values may not match any of the reservoir-fracture combination stored in the correlation matrix and interpolation procedures may be applied to the correlation matrix (as a discrete function) to determine the multipliers (or modification parameters). Examples of the interpolation procedures may include multi-dimensional cubic spline interpolation, neural network technique, etc.

The following discussion describes one or more aspects of reservoir fracture simulation as an example.

Overall Concept

A. Generate a fine scale model for different fracture and reservoir property combinations in the training phase. The fine scale model is simulated using a reservoir simulator (e.g., ECLIPSE reservoir simulator). The result of the simulation is the cell block pressures of neighboring cell blocks (e.g., the nearest 26 cell blocks) around the cell containing the completion including a hydraulic fracture.

B. Perform a simulation of the coarse scale model using the same data as the fine scale model, except that the coarse scale model does not simulate the fracture.

C. Adjust the "strength" of the well connection factor and the "strength" of the transmissibility between the cells neighboring the well completion so that the results of element A and element B are equal (or the difference is within a specified range). Elements A-C are discussed below under the sub-heading "Correlation."

D. Construct a multi-dimensional cubic spline interpolation procedure that provides accurate values of the multipliers for any input parameters (i.e., fracture and reservoir property combinations not simulated in A and B).
  i. A standard cubic spline interpolant may be constructed in a C++ program utilizing a recursive loop.
  ii. The program may take as input the specific 6 parameters for which the well and transmissibility multipliers are required. Said in other words, each of the well and transmissibility multipliers may be a 3D vector multiplier.
  iii. Further, the program fits cubic polynomials in each of the 6 dimensions around the neighborhood of the values in (ii) and determines the best value (in a minimum least square error).

E. A multi-dimensional table is created using data from elements A, B, C, and D. Typically, the elements A, B, C, and D are performed many times for a large number of different fracture and reservoir property combinations in the training phase.

F. Build a functional relationship in closed form (e.g., F(a,b,c,d,e,f) where a,b,c,d,e,f are input parameters such as fracture and reservoir property combinations) that returns the multipliers for a given fracture and reservoir property combination. The functional relationship may be built based on an interpolation procedure such as the multi-dimensional cubic spline interpolation or neural network technique. In one scenario, the functional relationship is used to access the multi-dimensional table.

G. Identify fracture in reservoir (e.g., with different fracture and reservoir property combinations the real world reservoir being simulated) using a 2D well section canvas (see FIG. 9). Any glyphs (icons) may be used to indicate the presence of a hydraulic fracture.

H. Identify fracture in reservoir (e.g., with the real-world reservoir and fracture properties being simulated) using a 3D well section canvas (see FIG. 10).

I. Determine (e.g., by averaging) the near wellbore properties in around the fracture. This is discussed below under the sub-heading "Grid." In one scenario, elements A and B assume uniform (or homogeneous) grid properties to estimate the multipliers in the training phase. However, in real-world reservoirs, the permeability, porosity, net to gross of the reservoir, etc. will not be uniform. Accordingly, element H is performed to average the real-world values prior to selecting a multiplier from the multi-dimensional table created in element E.

J. The multipliers (e.g., the well connection multipliers and the near well transmissibility multipliers) are then inserted as simulator keywords into an existing simulation keyword file at the appropriate time and location in the model. The simulation is then run using the simulation keyword file. In one scenario, the model is used to model the real-world reservoir. Further, the cells in the model may not be uniform. For example, in certain scenarios, the coarse cells are replaced with a set of refined cells (although not necessarily as small as the fine cells used to produce the original correlation) to improve the modeling accuracy. The distribution of refined cells need not be uniform around the fracture—for example, the distribution may increase logarithmically in the direction perpendicular to the face of the hydraulic fracture.

In one scenario, the model in element J may be augmented to model the degradation of the fracture over time using additional time dependent multipliers. In one scenario, the time profile of the time dependent multipliers decreases linearly or exponentially as a function of time. The rate of decrease may be dependent upon the rock and hydraulic fracture properties.

Correlation

A. Select/specify the fracture geometry (e.g., height, width and orientation with respect to the cell blocks (i.e., the coarse grid)).

B. Select coarse cell block sizes and aspect ratio (i.e., Horizontal X divided by/Horizontal Y cell block sizes in a 2D example where the 2D plane is perpendicular to a substantially vertical fracture) for the coarse grid.

C. Select the fracture properties including permeability, porosity, thickness, stress directions.

D. Build a fine scale model of the hydraulically fractured well using Local Grid Refinement e.g., a subdivision of 33×33×33 in the coarse cell containing the fracture. The subdivision is fine enough to capture the fine scale response accurately.

E. Run the fine scale simulation using a fixed production rate (e.g., 1000 barrels of oil per day) target or a fixed bottom hole pressure target (e.g., 2000 psi versus a reservoir pressure of 5000 psi). Record results.

F. Build a coarse model without the presence of the hydraulic fracture using the coarse cell blocks defined in Correlation element B.

G. Run the coarse scale simulation using the same targets as for the fine model. Record results. For single porosity systems the results of the simulation may be wellbore pressure vs. time and neighboring cell block pressures vs. time. For dual porosity and dual permeability systems the matrix system pressures must also be recorded in the neighborhood of the well.

H. Adjust the coarse scale transmissibilities and well multiplier such that the results from the fine and coarse models match. For dual porosity and dual permeability systems the match function is extended to include matrix pressures. In one scenario, the models match when the well bottom hole pressure and the neighboring cell block pressures match. In one scenario, data for 26 neighboring cell blocks is used. FIG. 11A shows the results of simulating the coarse model and FIG. 11B shows the results of simulating the fine model following successful modification of the coarse scale transmissibilities and well multiplier.

Grid

A. Identify the group of coarse cells that the fracture intersects in 3D (from Overall concept element H).

B. Draw a rectangular bounding cube around this set of cells

C. Calculate a pore volume weighted average of the porosity. Pore volume weighted average of the porosity=$\Sigma$ (cell porosity*cell pore volume)/Σ (cell pore volume), where the sum is over the rectangular bounding cube.

D. Calculate an average permeability for the rectangular bounding cube in the X,Y,Z (or I,J,K) directions. This averaging technique may use arithmetic-harmonic, harmonic-arithmetic, harmonic or arithmetic averaging methods.

E. The aforementioned averaged values, the fracture permeability, the bounding box dimensions, bounding box aspect ratio and fracture orientation with respect to the bounding box sides is used to determine the near well and well transmissibility multipliers.

In one example implementation, reservoir fracture simulation can enable: (i) concurrent modeling of thousands wells; (ii) the capability to input the rock stress field within the reservoir from a simulator, where the local stress direction within each cell can be used set the expected hydraulic fracture orientation; (iii) the capability to model the time varying response of the hydraulic fracture and to estimate the best time to re-fracture the well, which may be implemented specifying a time dependence of the multipliers. The dependence may take the form of linear or exponential degradation or any other form that the user specifies; and (iv) modeling of Dual Porosity and Dual Permeability reservoir systems and may also be extended to the multiple porosity systems used to model Coal bed Methane reserves.

Figure 13:
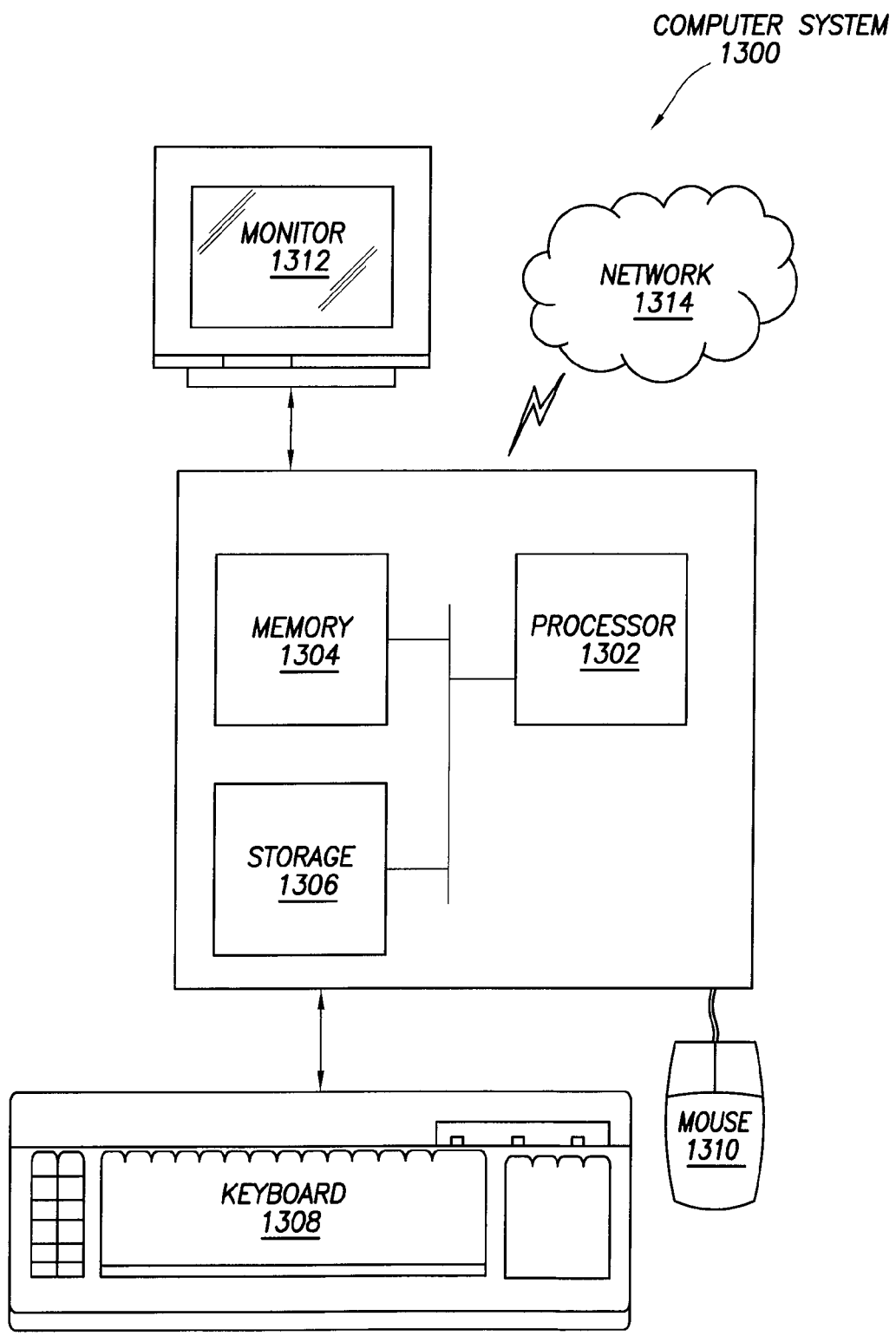
FIG. 13 shows a computer system in accordance with one or more embodiments of the invention.

Reservoir fracture simulation (or portions thereof), may be implemented on virtually any type of computer regardless of the platform being used. Embodiments of the invention (or portions thereof) may be implemented on virtually any type of computer regardless of the platform being used. For example, as shown in FIG. 13, a computer system (1300) includes one or more processor(s) (1302), associated memory (1304) (e.g., random access memory (RAM), cache memory, flash memory, etc.), a storage device (1306) (e.g., a hard disk, an optical drive such as a compact disk drive or digital video disk (DVD) drive, a flash memory stick, etc.), and numerous other elements and functionalities typical of today's computers (not shown). The computer system (1300) may also include input means, such as a keyboard (1308), a mouse (1310), or a microphone (not shown). Further, the computer system (1300) may include output means, such as a monitor (1312) (e.g., a liquid crystal display (LCD), a plasma display, or cathode ray tube (CRT) monitor). The computer system (1300) may be connected to a network (not shown) (e.g., a local area network (LAN), a wide area network (WAN) such as the Internet, or any other similar type of network) with wired and/or wireless segments via a network interface connection (not shown). Those skilled in the art will appreciate that many different types of computer systems exist, and the aforementioned input and output means may take other forms. Generally speaking, the computer system (1300) includes at least the minimal processing, input, and/or output means necessary to practice embodiments of the invention.

Further, those skilled in the art will appreciate that one or more elements of the aforementioned computer system (1300) may be located at a remote location and connected to the other elements over a network. Further, embodiments of the invention may be implemented on a distributed system having a plurality of nodes, where each portion of the invention may be located on a different node within the distributed system. In one embodiments of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a computer readable medium such as a compact disc (CD), a diskette, a tape, or any other computer readable storage device.

The systems and methods provided relate to acquisition of hydrocarbons from an oilfield. It will be appreciated that the same systems and methods may be used for performing subsurface operations, such as mining, water retrieval and acquisition of other underground materials.

While specific configurations of systems for performing operations associated with a reservoir are depicted, it will be appreciated that various combinations of the described systems may be provided. For example, various combinations of selected modules may be connected using the connections previously described. One or more modeling systems may be combined across one or more oilfields to provide tailored configurations for modeling a given oilfield or portions thereof. Such combinations of modeling may be connected for interaction therebetween. Throughout the process, it may be desirable to consider other factors, such as economic viability, uncertainty, risk analysis and other factors. It is, therefore, possible to impose constraints on the process. Modules may be selected and/or models generated according to such factors. The process may be connected to other model, simulation and/or database operations to provide alternative inputs.

It will be understood from the foregoing description that various modifications and changes may be made to the embodiments of reservoir fracture simulation discussed above without departing from their true spirit. For example, during a real-time drilling of a well it may be desirable to update the oilfield model dynamically to reflect new data, such as measured surface penetration depths and lithological information from the real-time well logging measurements. The oilfield model may be updated in real-time to predict the location in front of the drilling bit. Observed differences between predictions provided by the original oilfield model concerning well penetration points for the formation layers may be incorporated into the predictive model to reduce the chance of model predictability inaccuracies in the next portion of the drilling process. In some cases, it may be desirable to provide faster model iteration updates to provide faster updates to the model and reduce the chance of encountering an expensive oilfield hazard.

This description is intended for purposes of illustration only and should not be construed in a limiting sense. The scope of reservoir fracture simulation should be determined only by the language of the claims that follow. The term "comprising" within the claims is intended to mean "including at least" such that the recited listing of elements in a claim are an open group. "A," "an" and other singular terms are intended to include the plural forms thereof unless specifically excluded.

What is claimed is:

1. A method of evaluating a reservoir, comprising:
   obtaining data comprising properties of the reservoir and properties of a fracture in the reservoir;
   determining, by a processor of a computer system, modification parameters of a reservoir model of the reservoir based on the data using a correlation matrix, wherein the correlation matrix corresponds to an empirical functional relationship between the modification parameters and the data, wherein the modification parameters are time dependent, and wherein the correlation matrix is obtained based on a plurality of experimental fractures defined in the reservoir, wherein determining the modification parameters of the reservoir model using the correlation matrix is based on using the data as input to an interpolation procedure applied to the correlation matrix;

simulating, by the prcessor, effects of the fracture by selectively modifying the reservoir model using the modification parameters to generate a modified reservoir model; and modeling, by the processor, the reservoir with the fracture using the modified reservoir model to generate a result.

2. The method of claim 1, wherein the method further comprising:

obtaining the reservoir model, wherein the reservoir model is based on applying the properties of the reservoir to a coarse grid representing the reservoir; and creating the correlation matrix for the reservoir model comprising:

defining experimental properties of the reservoir and the plurality of experimental fractures in the reservoir;

defining, for each of the plurality of experimental fractures, corresponding experimental fracture properties and corresponding experimental modification parameters;

simulating the reservoir with each of the plurality of experimental fractures using a reservoir model at a coarse scale and modifying the reservoir model at the coarse scale using the corresponding experimental modification parameters to generate a corresponding coarse result, wherein the reservoir model at the coarse scale is based on the experimental properties of the reservoir;

simulating the reservoir with each of the plurality of experimental fractures using a reservoir model at a fine scale to generate a corresponding fine result, wherein the reservoir model at the fine scale is based on the experimental properties of the reservoir and the corresponding experimental fracture properties;

adjusting, for each of the plurality of experimental fractures, the corresponding experimental modification parameters to generate corresponding modification parameters to match the corresponding coarse result to the corresponding fine result; and generating the correlation matrix comprising the corresponding modification parameters for each of the plurality of experimental fractures as a discrete function of the experimental properties of the reservoir and the corresponding experimental fracture properties.

3. The method of claim 2, wherein, for each of the plurality of experimental fractures, the reservoir model at the coarse scale is created by applying the experimental properties of the reservoir to an experimental coarse grid representing the reservoir; and wherein, for each of the plurality of experimental fractures, the reservoir model at the fine scale is created by applying the experimental properties of the reservoir and the corresponding experimental fracture properties to an experimental fine grid derived based on the experimental coarse grid.

4. The method of claim 3, wherein the experimental properties of the reservoir comprises at least one selected from a group consisting of representative permeability of the reservoir, representative porosity of the reservoir, and geometry of the experimental coarse grid, wherein the properties of the reservoir comprises at least one selected from a group consisting of permeability of the reservoir, porosity of the reservoir, and geometry of the coarse grid to which the properties of the reservoir were applied, wherein the experimental properties of the plurality of experimental fractures comprises at least one selected from a group consisting of permeability, porosity, conductivity, and geometry of the plurality of experimental fractures, wherein the properties of the fracture comprises at least one selected from a group consisting of permeability, porosity, conductivity, and geometry of the fracture, and wherein geometry comprises at least one selected from a group consisting of dimensions, orientation, aspect ratio, and location.

5. The method of claim 2, wherein geometry of the fracture comprises direction of the fracture, and wherein obtaining the data of the reservoir and the fracture comprises:

obtaining information of a rock stress field in the reservoir from a simulator; and determining the direction of the fracture based on the rock stress field.

6. The method of claim 1, wherein the fracture is associated with a wellbore in the reservoir, and wherein the result comprises at least one selected from a group consisting of wellbore pressure of the wellbore versus time and grid block pressure near the wellbore versus time.

7. The method of claim 6, wherein the modification parameters modify at least one selected from a group consisting of near wellbore transmissibility and well productivity index associated with the wellbore.

8. A method of evaluating a reservoir, comprising:

defining experimental properties of the reservoir and experimental properties of an experimental fracture in the reservoir;

simulating, by a processor of a computer system, the reservoir with the experimental fracture to obtain a coarse result by applying the experimental properties of the reservoir to an experimental coarse grid representing the reservoir and modifying the experimental properties of the reservoir for an experimental coarse cell of the experimental coarse grid, using an experimental modification parameter for the experimental coarse cell, wherein the experimental coarse cell is disposed about the experimental fracture;

simulating, by the processor, the reservoir with the experimental fracture to obtain a fine result by applying the experimental properties of the reservoir and the experimental properties of the experimental fracture to a fine grid derived based on the experimental coarse grid;

adjusting the experimental modification parameter to generate a first modification parameter for matching the coarse result and the fine result;

creating a correlation matrix comprising the first modification parameter as a discrete function of the experimental properties of the reservoir and the experimental properties of the experimental fracture;

obtaining properties of the reservoir and properties of a fracture in the reservoir;

determining, by the processor, a second modification parameter for a coarse cell of a coarse grid representing the reservoir, wherein the coarse cell is disposed about the fracture, wherein determining the second modification parameter is by using the correlation matrix based on the properties of the reservoir and the properties of the fracture as inputs to a pre-determined interpolation procedure applied to the correlation matrix; and simulating, by the processor, the reservoir with the fracture to obtain a result by applying the properties of the reservoir to the coarse grid and modifying the properties of the reservoir for the coarse cell using the second modification parameter.

9. The method of claim 8, wherein the experimental properties of the reservoir comprises at least one selected from a group consisting of representative permeability of the reservoir, representative porosity of the reservoir, and geometry of the experimental coarse grid, wherein the properties of the reservoir comprises at least one selected from a group consisting of permeability of the reservoir, porosity of the reservoir, and geometry of the coarse grid to which the properties of the reservoir were applied, wherein the experimental properties of the experimental fracture comprises at least one selected from a group consisting of permeability, porosity, conductivity, and geometry of the experimental fracture, wherein the properties of the fracture comprises at least one selected from a group consisting of permeability, porosity, conductivity, and geometry of the fracture, and wherein geometry comprises at least one selected from a group consisting of dimensions, orientation, aspect ratio, and location.

10. The method of claim 9, wherein geometry of the fracture comprises direction of the fracture, and wherein obtaining the properties of the fracture comprises:
obtaining information of a rock stress field in the reservoir from a simulator; and
determining the direction of the fracture based on the rock stress field.

11. The method of claim 8, wherein the coarse result, the fine result, and the result comprise at least one selected from a group consisting of wellbore pressure of a wellbore in the reservoir versus time and grid block pressure near the wellbore versus time.

12. The method of claim 11, wherein the experimental modification parameter, the first modification parameter, and the second modification parameter modify at least one selected from a group consisting of near wellbore transmissibility and well productivity index associated with the wellbore.

13. The method of claim 8, further comprising:
performing production planning based on the result,
wherein the fracture comprises a hydraulic fracture formed about a wellbore of an oilfield for extracting fluid from the reservoir.

14. The method of claim 8, further comprising:
performing a completion design based on the result,
wherein the fracture comprises a hydraulic fracture to be formed about a wellbore of an oilfield for extracting fluid from the reservoir.

15. The method of claim 8, further comprising:
identifying a plurality of coarse cells of the coarse grid, wherein the fracture intersects each of the plurality of coarse cells; and
creating a bounding box in the coarse grid enclosing the plurality of coarse cells, wherein the coarse cell is selected within the bounding box,
wherein the properties of the reservoir and the properties of the fracture comprises at least one selected from a group consisting of a pore volume weighted average of porosity of the bounding box and an average permeability of the bounding box.

16. A non-transitory computer readable medium storing computer executable instructions which when executed by a computer perform a method for evaluating a reservoir, the computer executable instructions comprising functionality to:

obtain data of the reservoir and a fracture in the reservoir;

determine modification parameters of a reservoir model of the reservoir based on the data using a correlation matrix, wherein the correlation matrix corresponds to an empirical functional relationship between the modification parameters and the data, wherein the modification parameters are time dependent, and wherein the correlation matrix is obtained based on a plurality of experimental fractures defined in the reservoir, wherein determining the modification parameters of the reservoir model using the correlation matrix is based on using the data as input to an interpolation procedure applied to the correlation matrix;

simulate effects of the fracture by selectively modifying the reservoir model using the modification parameters to generate a modified reservoir model;

model the reservoir with the fracture using the modified reservoir model to generate a result; and perform an operation associated with the reservoir based on the result.

17. The non-transitory computer readable medium of claim 16, wherein the computer executable instructions further comprising functionality to:

obtain the reservoir model, wherein the reservoir model is based on applying the properties of the reservoir to a coarse grid representing the reservoir; and create the correlation matrix for the reservoir model comprising:
defining experimental properties of the reservoir and the plurality of experimental fractures in the reservoir;
defining, for each of the plurality of experimental fractures, corresponding experimental fracture properties and corresponding experimental modification parameters;
simulating the reservoir with each of the plurality of experimental fractures using a reservoir model at a coarse scale and modifying the reservoir model at the coarse scale using the corresponding experimental modification parameters to generate a corresponding coarse result, wherein the reservoir model at the coarse scale is based on the experimental properties of the reservoir;
simulating the reservoir with each of the plurality of experimental fractures using a reservoir model at a fine scale to generate a corresponding fine result, wherein the reservoir model at the fine scale is based on the experimental properties of the reservoir and the corresponding experimental fracture properties;
adjusting, for each of the plurality of experimental fractures, the corresponding experimental modification parameters to generate corresponding modification parameters to match the corresponding coarse result to the corresponding fine result; and
generating the correlation matrix comprising the corresponding modification parameters for each of the plurality of experimental fractures as a discrete function of the experimental properties of the reservoir and the corresponding experimental fracture properties.

18. The non-transitory computer readable medium of claim 17,
  wherein, for each of the plurality of experimental fractures, the reservoir model at the coarse scale is created by applying the experimental properties of the reservoir to an experimental coarse grid representing the reservoir, and
  wherein, for each of the plurality of experimental fractures, the reservoir model at the fine scale is created by applying the experimental properties of the reservoir and the corresponding experimental fracture properties to an experimental fine grid derived based on the experimental coarse grid.

19. The non-transitory computer readable medium of claim 18,
  wherein the experimental properties of the reservoir comprises at least one selected from a group consisting of representative permeability of the reservoir, representative porosity of the reservoir, and geometry of the experimental coarse grid,
  wherein the properties of the reservoir comprises at least one selected from a group consisting of permeability of the reservoir, porosity of the reservoir, and geometry of the coarse grid to which the properties of the reservoir were applied,
  wherein the experimental properties of the plurality of experimental fractures comprises at least one selected from a group consisting of permeability, porosity, conductivity, and geometry of the plurality of experimental fractures,
  wherein the properties of the fracture comprises at least one selected from a group consisting of permeability, porosity, conductivity, and geometry of the fracture, and
  wherein geometry comprises at least one selected from a group consisting of dimensions, orientation, aspect ratio, and location.

* * * * *